US011782913B2

(12) United States Patent
Pansare et al.

(10) Patent No.: US 11,782,913 B2
(45) Date of Patent: Oct. 10, 2023

(54) AI-BASED DATA VIRTUALIZATION

(71) Applicant: International Business Machines Corporation, Armonk, NY (US)

(72) Inventors: Snehal U Pansare, Pune (IN); Sumeet Surendra Kapoor, Pune (IN); Girish Padmanabhan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 17/205,130

(22) Filed: Mar. 18, 2021

(65) Prior Publication Data
US 2022/0300497 A1    Sep. 22, 2022

(51) Int. Cl.
*G06F 7/00*     (2006.01)
*G06F 16/242*   (2019.01)
*G06N 20/00*    (2019.01)

(52) U.S. Cl.
CPC ......... *G06F 16/2433* (2019.01); *G06N 20/00* (2019.01)

(58) Field of Classification Search
CPC .. G06F 16/2433; G06F 16/192; G06F 16/258; G06F 16/196; G06F 16/176; G06F 16/24557; G06F 16/972; G06N 20/00
See application file for complete search history.

(56) References Cited

U.S. PATENT DOCUMENTS

| | | | | |
|---|---|---|---|---|
| 7,266,538 B1* | 9/2007 | Shatil | ............... | G06F 12/0862 707/999.009 |
| 7,506,371 B1* | 3/2009 | Ben-Natan | ............ | G06F 21/316 726/18 |
| 10,929,361 B2* | 2/2021 | Gerweck | ............... | G06F 16/215 |
| 11,082,487 B1* | 8/2021 | Jain | ......................... | H04L 63/20 |
| 11,315,041 B1* | 4/2022 | Jain | ....................... | G06N 20/20 |
| 2013/0160072 A1* | 6/2013 | Reus | ..................... | H04L 63/102 726/1 |
| 2014/0258155 A1* | 9/2014 | Suryanarayanan | ......................... | H04L 67/1021 726/29 |
| 2015/0269383 A1* | 9/2015 | Lang | ...................... | H04L 63/20 726/1 |

(Continued)

OTHER PUBLICATIONS

Van Loon, R., "AI Is Transforming Real-Time Data Governance", Last updated on Sep. 25, 2020, 8 pages <https://www.simplilearn.com/ai-is-transforming-real-time-data-governance-article>.

(Continued)

*Primary Examiner* — Mohammed R Uddin
(74) *Attorney, Agent, or Firm* — Donald J. O'Brien

(57) ABSTRACT

Embodiments are disclosed for a method. The method includes determining a context of a data access request for a data virtualization engine. The method also includes determining data sources that are relevant to the data access request by using a governance machine learning model trained to predict the data sources based on the request and the context. Additionally, the method includes determining data governance rules-policies that are relevant to the request, by using the governance machine learning model, further trained to predict the data governance rules-policies based on the data sources and the context. Further, the method includes generating, by using a query machine learning model, a data access command executable by the data virtualization engine and configured to retrieve data from the data sources and apply the data governance rules-policies.

18 Claims, 7 Drawing Sheets

(56) References Cited

U.S. PATENT DOCUMENTS

| | | | |
|---|---|---|---|
| 2016/0070758 A1* | 3/2016 | Thomson | G16H 10/60 |
| | | | 707/781 |
| 2017/0010829 A1* | 1/2017 | Chen | G06F 3/0637 |
| 2017/0039379 A1* | 2/2017 | Skipper | H04L 63/20 |
| 2017/0091279 A1 | 3/2017 | Shah et al. | |
| 2018/0316681 A1* | 11/2018 | Frahim | H04L 63/102 |
| 2019/0005421 A1* | 1/2019 | Hammel | G06Q 10/06393 |
| 2020/0250328 A1* | 8/2020 | Swenson | H04L 63/0853 |
| 2020/0394455 A1* | 12/2020 | Lee | G06K 9/6259 |
| 2021/0173952 A1* | 6/2021 | Raphael | G06F 21/6218 |

OTHER PUBLICATIONS

Devlin, B., "Streamlining Data Virtualization with AI and ML", Dec. 12, 2019, 8 pages <https://www.datavirtualizationblog.com/streamlining-data-virtualization-with-ai-and-ml/>.

IBM, "Technical preview: Watson Knowledge Catalog in Data Virtualization", printed Jan. 28, 2021, 12 pages.

Ramos et al., "Cognitive Data Governance—Powered by Machine Learning to find and use governed data", IBM Unified Governance & Integration, White Paper, 2018, 8 pages.

Unknown, "The Denodo Platform for Modern Data Virtualization", 2020, 2 pages.

Chandrasekaran, S., "The Role of Data Virtualization in Artificial Intelligence and Machine Learning", Published Date: Nov. 11, 2020, 10 pages.

Mell et al., "The NIST Definition of Cloud Computing", Recommendations of the National Institute of Standards and Technology, Sep. 2011, 7 pages.

\* cited by examiner

AI-BASED DATA VIRTUALIZATION

BACKGROUND

The present disclosure relates to artificial intelligence (AI), and more specifically to AI-based data virtualization.

Data virtualization is a technology that helps collect data from heterogenous source systems without moving the data. More specifically, data virtualization can integrate a heterogenous group of data sources across multiple types and locations. Further, data virtualization techniques can provide access to this heterogenous group of data in a homogenous, logical data view.

SUMMARY

Embodiments are disclosed for a method. The method includes determining a context of a data access request for a data virtualization engine. The method also includes determining data sources that are relevant to the data access request by using a governance machine learning model trained to predict the data sources based on the request and the context. Additionally, the method includes determining data governance rules-policies that are relevant to the request, by using the governance machine learning model, further trained to predict the data governance rules-policies based on the data sources and the context. Further, the method includes generating, by using a query machine learning model, a data access command executable by the data virtualization engine and configured to retrieve data from the data sources and apply the data governance rules-policies.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
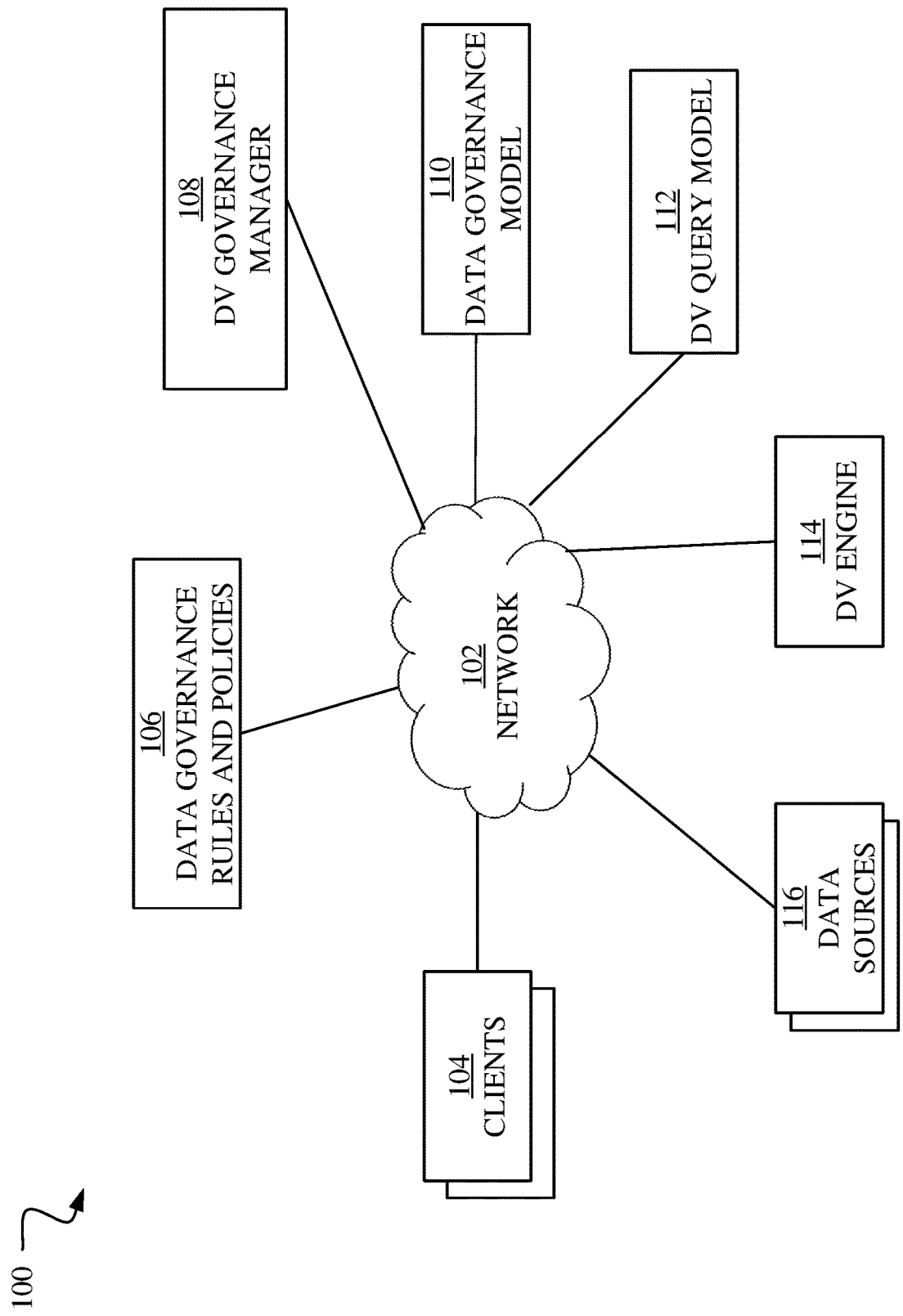
FIG. 1 is a block diagram of an example system for AI-based data virtualization, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, data virtualization can provide convenient data access, but depending on the jurisdictions of the data involved, data virtualization can also create legal responsibilities. In fact, data governance rules across multiple jurisdictions can apply to each data virtualization transaction. However, as the regulation of data is a developing field, the data governance rules can come into effect after data virtualization systems have already been put in place. As such, data virtualization systems may not have data governance built-in.

Rather, data governance may not be applied until after the virtualized data is accessed. More specifically, a data steward applies the policies based on catalogued rules that are written in plain text. In fact, the data steward typically applies data governance policies manually, which can be time-consuming, and subject to human error. In some cases, data governance can be applied at the logical level, and based on controls regarding what data is exposed (and, to whom). However, data virtualization can still expose data to risk in transit, and implicate other legal complexities (even though the virtualized data may be in an encrypted format).

Accordingly, some embodiments of the present disclosure can predict the governance rules to protect data retrieved from multiple sources in a data virtualization system. Additionally, an AI based data steward can execute text-based governance rules in a data virtualization engine. Accordingly, some embodiments of the present disclosure can improve data virtualization engines by incorporating data governance into the data access itself. In this way, such embodiments can mitigate the challenges of data virtualization, such as, security and efficiency.

FIG. 1 is a block diagram of an example data governance system 100 for data virtualization, in accordance with some embodiments of the present disclosure. The data governance system 100 includes a network 102, clients 104, data governance rules and policies 106, data virtualization (DV) governance manager 108, data governance model 110, DV query model 112, DV engine 114, and data sources 116. The network 102 may be a local area network, wide area network, or collection of computer communication networks that facilitates communication between components of the system 100, specifically, between the clients 104, data governance rules and policies 106, DV governance manager 108, data governance model 110, DV query model 112, data virtualization (DV) engine 114, and data sources 116. In some embodiments, the network 102 can be the Internet.

The clients 104 can be computing devices and/or software applications that use the DV engine 114 for a homogenous view of various data sources 116. For example, the clients 104 can include a data engineer, data scientist, a business user, a customer, and the like.

The data governance rules and policies 106 can be an electronically stored collection of government regulations, industry standards, and other texts relevant to data governance. The data governance rules and policies 106 can be stored, for example, in a searchable database. The data governance rules and policies 106 can include structured and unstructured data. More specifically, the data governance rules and policies 106 can include contractual documents, images, videos, textual notes, email threads, and the like.

The DV engine 114 can be a data virtualization platform capable of selecting data from heterogenous data sources, such as the data sources 116, and integrating the data into a homogenous view for the requesting client 104. The data sources 116 can be a heterogenous group of electronically accessible source of data, including storage systems and networks, databases, indexed files, flat files, proprietary files, and the like. The data sources 116 may also be disposed in multiple geographic locations.

The DV governance manager 108 can provide an interface to the DV engine 114 that enables clients 104 to provide a formatted or unformatted data access request for a DV engine 114. Further, the DV governance manager 108 can use the data governance model 110 to identify the data sources 116 and data governance rules and policies 106 that are relevant to the request. Additionally, the DV governance manager 108 can use the DV query model 112 to automatically translate the identified data sources, rules, and policies into a data access command executable by the DV engine 114. Further, the DV governance manager 108 can provide visualizations of the results for the data access request. For example, the DV governance manager 108 can generate side by side comparisons of the data as accessed versus the data as modified by the applied data governance rules and policies 106. For example, in some cases, the DV engine 114 may mask a column of retrieved data based on specific rules or policies. Thus, a side-by-side visualization can show the actual retrieved column data alongside the masked version. According to some embodiments of the present disclosure, the DV governance manager 108 can generate these visualizations in two and three-dimensional (2D and 3D) models.

The data governance model 110 can be a machine learning model that is trained to predict relevant data governance rules and policies 106 for a data access requests from the clients 104. More specifically, the data governance model 110 can be trained on persona or user details (e.g., data scientist, business users, and the like), country of origin, historical data access requests, and all the data governance rules and policies 106. Accordingly, the data governance model 110 can predict if: the data access request is valid or not; the level of data access permitted; the context and/or purpose of the data access request; and, the relevant data governance rules and policies for the data access requested. Further, the data governance model 110 can predict if the relevant data governance rules and policies are applied on specific systems; and, the permitted data access for the requesting client based on the relevant data governance rules and policies. Thus, when the trained data governance model 110 receives a data access request from a client 104, the data governance model 110 can evaluate the data access request and predict the relevant data governance rules and policies to apply on the accessed data. The output of the data governance model 110 can be an object that identifies the data objects requested, and the relevant data governance rules and policies to be applied on the accessed data.

In some embodiments, the data governance model 110 can be trained on clients' historical data access requests, data sources 116, behavior of the data, consent, data type (personally identifiable information (PII), sensitive personal information (SPI), healthcare data, and the like), the context for access to different data objects, data governance rules and policies 106, explicit mappings of specific data governance rules and policies to data objects, and regulatory policies to be applied (like the General Data Protection Regulation (GDPR), California Consumer Privacy Act (CCPA), Health Insurance Portability and Accountability Act (HIPAA), and the like).

Additionally, the DV query model 112 can be a machine learning model that is trained to translate specific data governance rules and policies defined in a natural language into a query language statement that the DV engine 114 can execute. Thus, the DV query model 112 can input the predicted data governance rules and policies (written in a natural language) and data objects from the data governance model 110 and generate specific query language statement(s) configured to: 1) access the data objects, and 2) apply select data governance rules and policies to the accessed data. More specifically, the DV query model 112 can identify specific data objects in the data sources 116 relevant to the predicted data governance rules and policies 106. In this way, the DV query model 112 can dynamically incorporate data governance into systems for data virtualization, such as the DV engine 114.

The data governance rules and policies 106 can be textual specifications, written in a natural language (e.g., English, Chinese, and so on) that the DV engine 114 does not understand. Hence, the DV query model 112 can use artificial intelligence techniques (e.g., natural language processing) to translate data governance rules and policies 106 into a language and/or format that the DV engine 114 understands and can execute. The DV query model 112 can receive, from the data governance model 110, the above-described object that identifies the data objects requested, and the relevant data governance rules and policies to be applied on the accessed data. Further, the DV query model 112 can generate a corresponding, formulated request to the DV engine 114. In response to this formulated request, the DV engine 114 can provide, for the corresponding data sources 116 referenced in the formulated request, an executable instruction to access the data objects specified, and apply the relevant rules and policies. In some embodiments of the present disclosure, the DV engine 114 can use data source connectors (not shown) that query the data and return the results back to the DV engine 114. Data source connectors can be application programming interfaces that enable the DV engine 114 to access different classes, types, and/or vendors of the data sources 116. Further, the DV engine 114 can combine the results from the data sources 116, and provide the combination to the requesting client 104.

In this way, the example system 100 can provide a 3D or 2D visualization in an end-to-end process where an administrator can adjust for integration into a larger ecosystem. For example, the administrator can add, modify, or delete rules to comply with the overall ecosystem. Further, the example system 100 can provide a data governance and visualization experience in a specific system context. This can help data stewards or data administrators to visualize the applied rules and restrictions, and provides the ability to seamlessly manage and connect dependent rules for the specific components within the overall enterprise system.

The proposed system uses the historical updates and changes to rules and uses AI/ML technique on data stewards' actions and decisions by creating the correlation between policies and data access requests, to make sure next rules build are using the historical learning to adapt to changes done in past. For example, a data steward working on a System A may decide to mask a PII-classified data item such as, the social security number (SSN). Thus, results for data access requests to system A may mask SSN. However, there may also be a System B that has PII but does not mask SSN. According to some embodiments of the present disclosure, when the client submits a data access request for the SSN in System B, the data governance model 110 (trained to consider the data steward's historical choices) can determine that the System B SSN also be masked. Further, the data governance model 110 can use artificial intelligence to consider various factors such as, the origin of the request, enterprise roles and responsibilities of the requestor, context of the data, source and target systems to predict the relevant data governance rules and policies 106 to apply.

Figure 2:
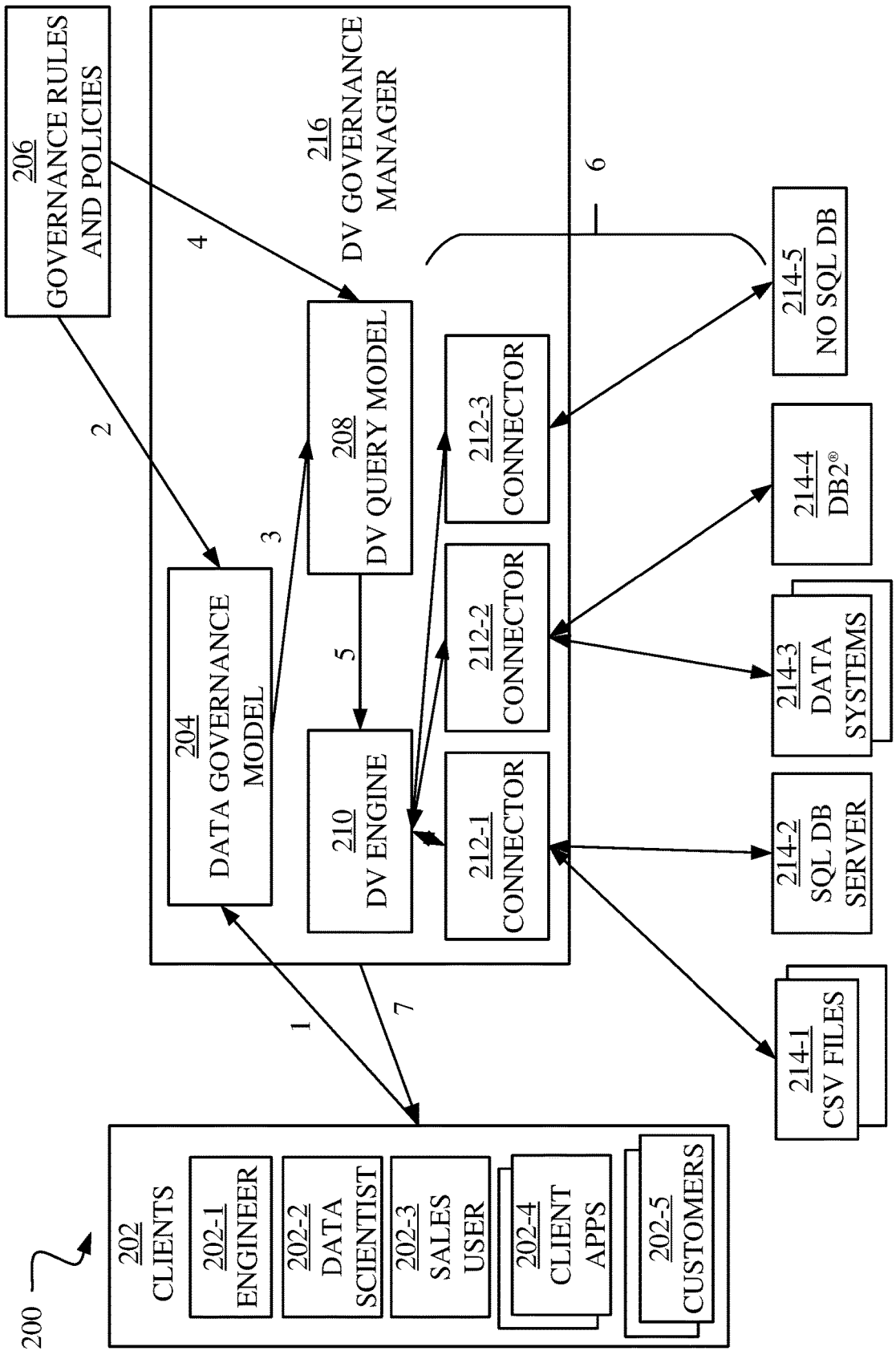
FIG. 2 is an example AI-based data virtualization system and example process flow, in accordance with some embodiments of the present disclosure.

FIG. 2 is an example AI-based data virtualization system and example process flow, in accordance with some embodiments of the present disclosure. The data governance system 200 includes clients 202, data governance model 204, data governance rules and policies 206, DV query model 208, DV engine 210, connectors 212-1 through 212-3 (also referred to collectively as connectors 212), data sources 214, and DV governance manager 216. The clients 202 are similar to the clients 104 described with respect to FIG. 1, and include example clients: engineer 202-1, data scientist 202-2, sales user 202-3, client applications (APPS) 202-4, and customers 202-5. The engineer 202-1 can be a data engineer. The data scientist 202-2 can be a technical professional with expertise in information science. The sales user 202-3 can be a business user of the data governance system 200. The client applications 202-4 can be software configured to generate data access requests for a DV engine, such as the DV engine 210. The customers 202-5 can be customers of the DV engine 210. The data governance model 204, data governance rules and policies 206, DV query model 208, DV engine 210, data sources 214, and DV governance manager 216 can be similar to the data governance model 110, data governance rules and policies 106, DV query model 112, DV engine 114, data sources 116, and DV governance manager 108.

Further, the data governance system 200 includes data sources, such as text-comma separated values (CSV) files 214-1, a structured query language (SQL) database (DB) server 214-2, data systems 214-3, DB2® database 214-4, and non-SQL database 214-5. These data sources are also referred to collectively as data sources 214.

As shown, various features of the data governance system 200 are connected using arrowed lines number one through seven. These arrowed lines represent techniques of the data governance system 200. More specifically, the line 1 from the clients 202 to the data governance model 204 can represent a client 202 sending a data access request for the DV engine 210 to the data governance model 204 for initial processing. As stated previously, the data governance model 204 can predict the data governance rules and policies 206 that apply to the data access request. Accordingly, the line 2 from the data governance rules and policies 206 to the data governance model can represent the data governance model 204 selecting the relevant data governance rules and policies based on the data access request. Additionally, the data governance model 204 can identify the data objects in the data sources 214 that are relevant to the request. Accordingly, the line 3 from the data governance model 204 to the DV query model 208 can represent the data governance model 204 sending the object to the DV query model 208 indicating the identified objects and relevant governance rules and policies.

As stated previously, the DV query model 208 can translate data governance rules and policies 106 into a language and/or format that the DV engine 114 understands and can execute. Further, the DV query model 208 can generate a corresponding, formulated request to the DV engine 210. Accordingly, the line 4 can represent the DV query model 208 reading the textual representations of the relevant data governance rules and policies indicated by the object provided by the data governance model 204. Additionally, the line 5 can represent the DV query model 208 providing the formulated request for the DV engine 210. In the data governance system 200, there are multiple lines numbered 6. The lines 6 can represent the DV engine 210 sending parsed versions of the formulated request to the connectors 212 corresponding to the relevant data sources. Additionally, the lines 6 can represent the connectors 212 providing the parsed versions to the relevant data sources 214. Further, the lines 6 can represent the data sources 214 and the connectors 212 returning the results to the connectors 212 and DV engine 210, respectively. Additionally, the line 7 can represent the DV engine 210 providing a combination of the results for the requesting client 202.

In an example, the data sources 214 can include a human resources system storing PII such as, name, contact telephone number, email, salary, social security number, employment date, and birthday. Additional data sources 214 can include a sales database that stores SPI about products for sale, including the vendor, sale price, product name, salesperson, and email address. Further data sources 214 can include a sales transactions database that contains SPI related to completed sales. Such information can include a sales code, product name, purchase date, number of warrantee years, the amount of the sale, and a credit card number. Each of these data sources can have varying levels of data quality. The data quality can be a numeric reliability measure, in the range of 0 to 100%. In this example, the human resources database may have 90% data quality; the sales database may have 80% data quality; and, the sales transaction system may have 85% data quality.

Thus, a data scientist 202-2 (in India) can use the data governance system 200 to create a report of sales transactions amounts and calculated salaries for the associated sales employees. The report can calculate salaries based on data about completed sales by salesperson employees in the data sources 214. Further, the data scientist 202-2 can use the details of sales and transactions to update salaries back in the human resource database.

To create the report, the data scientist 202-2 can submit a data access request to the data governance model 204. Accordingly, the data governance model 204 can determine that the data access request is coming from the data scientist 202-2 and that the data scientist 202-2 is submitting the data access request from India. In some embodiments of the present disclosure, the data governance model 204 can determine whether external users have consent to access the data access requested. The term, external users, refers to clients 202 that may be disposed geographically external to the nation, state, and the like, where the data is stored, e.g., the data sources 214 are located.

Additionally, the data governance model 204 can determine that some of the data access requested is in the human resources database. Further, based on the training received, the data governance model 204 can determine the access restrictions for data scientists on PII by identifying the relevant data governance rules and policies 206. For example, the DV governance model 204 can determine whether to apply data quality rules to the data access request, thus restricting results based on a predetermined data quality threshold, e.g., data quality at or exceeding 85%. Thus, if the original data access request indicates data in a sales database (where the data quality of 80% does not meet this threshold) the data governance model 204 can generate a mapping indicating that data from the sales database is not included in the results.

Additionally, the data governance model 204 can identify an indirect relation of rule. For example, the data governance model 204 can determine that PII data returned in the result is masked for all users except administrators. The data governance model 204 can make this determination based on the data access requested from the human resources system is PII data. Additionally, the data governance model 204 can suggest a rule such as, classifying credit card data coming from a sales transaction database as SPI. However, for credit card data, there may not be a rule defined for SPI data. Accordingly, the data governance model 204 can suggest enforcing a credit card rule for PII based on column similarity. Thus, even though a credit card number may be stored under a different column in another database, because the data content is similar to credit card numbers, the data governance model 204 can learn to classify the differently labeled column as a credit card number. Accordingly, the data governance model 204 can identify the relevant data governance rules and policies 206 to apply. It is noted that the credit card number is merely an example of how the data governance model 204 can learn to apply rules meant for a particular data classification across databases that may use different column identifiers.

Further, the data governance model 204 can look at the data governance rules and policies 206, and determine that a rule prohibiting PII from leaving European boundaries applies to the data access request. More specifically, the data governance model 204 can determine that the GDPR applies to the data access request because the data source 214 is located in Europe, and the requesting user (data scientist 202-2) is in India. Additionally, the DV governance manager 216 can use a consent management database (not shown) to check for the consent of the clients 202.

Accordingly, the data governance model 204 can generate an object for the DV query model 208. The object can identify the data sources 214 and predict a number of data governance rules and policies 206 that apply to the data access request. Further, the data governance model 204 can retain a copy of the data access request and associated object for future model training.

Figure 3:
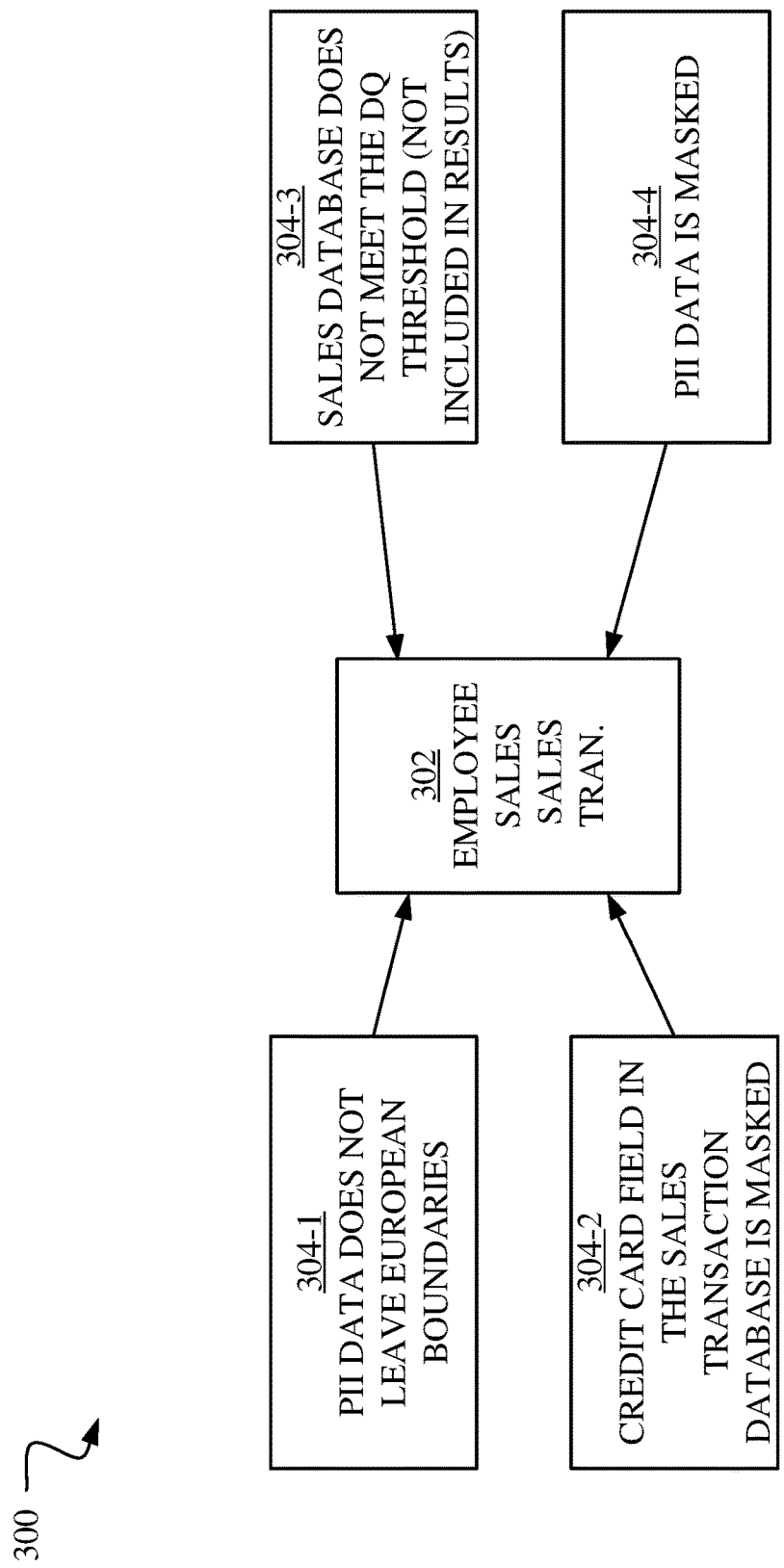
FIG. 3 is a block diagram of example object for AI-based data virtualization, in accordance with some embodiments of the present disclosure.

FIG. 3 is an example object 300 for the DV query model 208, in accordance with some embodiments of the present disclosure. The example object 300 includes data sources 302 and data governance rules and policies 304-1 through 304-4. The data sources 302 identify employee, sales, and sales transaction databases for the data access request. Further, the data governance rules and policies 304-1 indicates that PII data not leave European boundaries. Additionally, the data governance rules and policies 304-2 indicates that the credit card field in the sales transaction database is masked. Also, the data governance rules and policies 304-3 indicates that the data quality of the sales database does not meet the data quality threshold of 85% and is not included in the results for the data access request. Further, the data governance rules and policies 304-4 indicates that PII data is masked.

Referring back to FIG. 2, the DV query model 208 can apply an artificial intelligence technique such as, natural language processing, to translate these predicted data governance rules and policies into a predetermined input format for the DV engine 210. More specifically, the DV query model 208 can generate data access commands to retrieve the data access requested from the specific data sources 214. For example, the DV query model 208 can generate an SQL command that retrieves data from the SQL DB server 214-2, and applies GDPR governance rules. For example, DV query model 208 can generate the EXAMPLE data access command 1:

SELECT Mask(Credit card), Email, Name, Contact SSN from HR, Sales Transaction JOIN on SSN where country=IN.

EXAMPLE DATA ACCESS COMMAND 1

When executed by the relevant data source 214 the EXAMPLE data access command 1 can retrieve the listed data from database tables HR and Sales Transaction, using the social security number (JOIN on SSN) stored in both tables to map rows in the HR table to rows in the Sales Transaction table. Additionally, the EXAMPLE data access command 1 can apply the GDPR rule preventing data stored in Europe from crossing European borders by limiting the data retrieved from data sources in India (e.g., where country=IN). The EXAMPLE data access command 1 also enforces another GDPR rule by masking credit card information.

The DV query engine 210 can thus use the associated data source connectors 212 to forward the data access commands to the data sources 214 indicated. Accordingly, the relevant data sources can query the requested data, apply the predicted data governance rules and policies 206, and return the result to the DV engine 210, which can aggregate the results from the various data sources 214, and provide the aggregated result to the requesting client 202.

Figure 4:
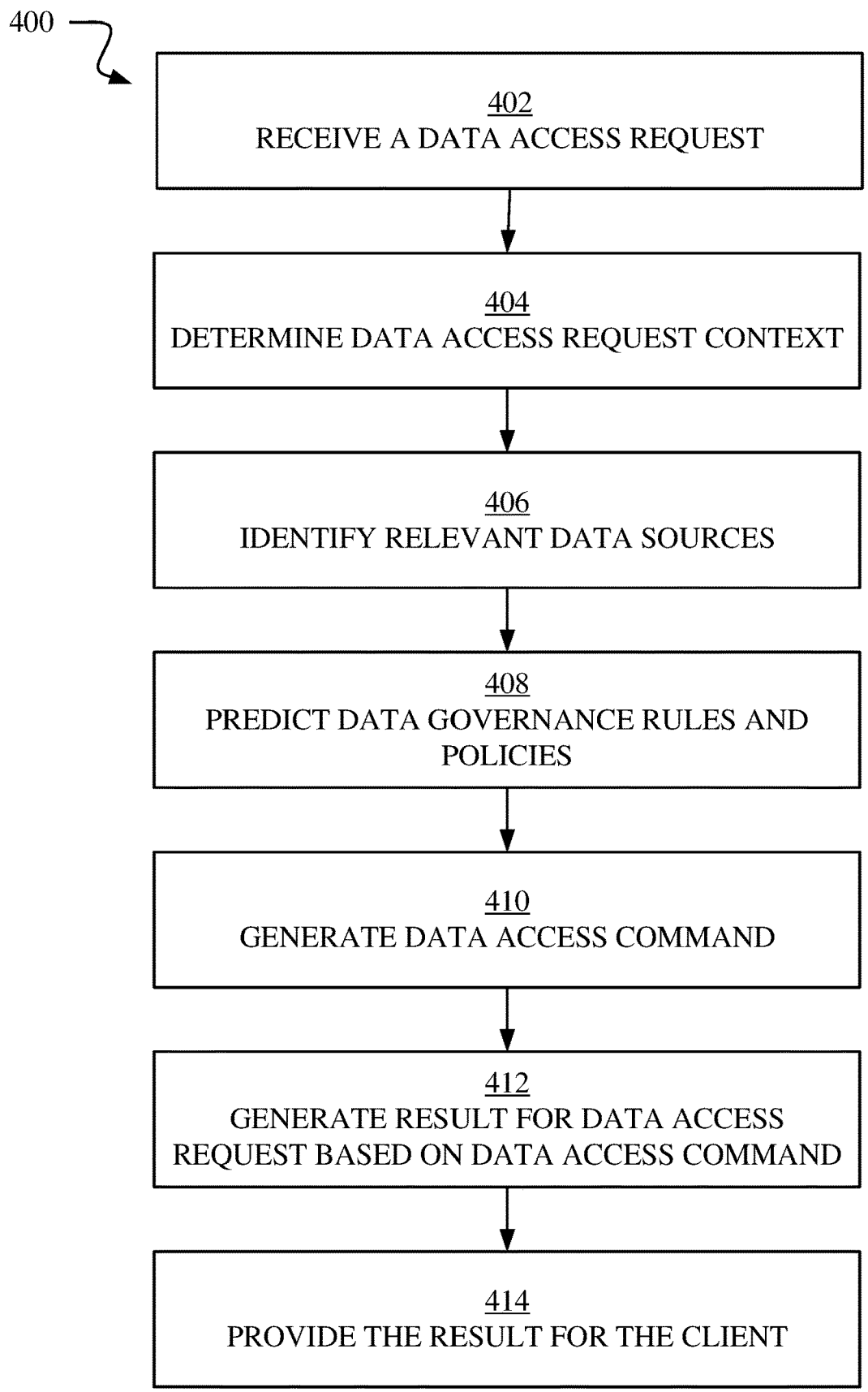
FIG. 4 is a process flow chart of an example method for AI-based data virtualization, in accordance with some embodiments of the present disclosure.

FIG. 4 is a process flow chart of an example method 400 for AI-based data virtualization, in accordance with some embodiments of the present disclosure. A DV governance manager and DV engine, such as the DV governance manager 108 and DV engine 114 can perform the method 400.

At operation 402, the DV governance manager 108 can receive a data access request from a client, such as the client 104. The data access request can include an application code for the DV engine 210. Alternatively, the data access request can include simple English phrases like SSN, Credit card, Phone numbers, Name, Addresses from data enterprise systems such as, customer relationship management, master data management (MDM), and/or Siebel.

At operation 404, the DV governance manager 108 can determine the data access request context. Determining the data access request context can include identifying \the data access requestor, e.g., the client 202. Additionally, the context can include the data context, data intent, consent, and the like. In this way, the DV governance manager 108 can identify the data access request scenario, which can influence the relevant data governance rules and policies 206.

At operation 406, the DV governance manager 108 can identify the relevant data sources for the data access request. More specifically, the DV governance manager 108 can use a data governance model, such as the data governance model 110, to identify the relevant data sources. The relevant data sources can be, for example, selected from the data sources 116, 214.

At operation 408, the DV governance manager 108 can predict the data governance rules and policies 206 that apply to the data access request. More specifically, the DV governance manager 108 can use the data governance model 110 to predict the data governance rules and policies 206. In some embodiments of the present disclosure, the data governance model 204 can predict the data governance rules and policies 206 that apply to the data access request using applied analytics that identify specific references in structured and unstructured data. More specifically, applied analytics can identify snippets of discussion in contractual documents, images, video notes, email conversation, and the like, that reference specific data governance rules and policies 206.

For example, a contract relevant to a data access request may indicate that data access is restricted to clients 202 that have signed consent forms confirming that the clients 202 have completed secure training and client on-boarding processes. Thus, the data governance model 204 can use artificial intelligence and natural language processing techniques that identify the data governance rules in the contract, and submit the contract for further processing to derive rules for subsequent operations.

At operation 410, the DV governance manager 108 can generate a data access command based on the identified data sources and relevant data governance rules and policies. More specifically, the DV governance manager 108 can use the DV query model 208 to automatically translate the predicted unstructured rules and policies into a data access command, such as, a QUERY understandable formatted instruction. The DV query model 208 can use semantic analytics and/or apply supervised, semi-supervised, and/or unsupervised machine learning and artificial intelligence techniques.

At operation 412, the DV engine 210 can generate a result for the data access request based on the generated data access command. As stated previously, the DV engine 210 can use the connectors 212 to forward the generated data access command to the relevant data sources, which may generate results and apply the relevant data governance rules and policies.

At operation 414, the DV governance manager 108 can provide the result for the client. Providing the result can involve aggregating results from multiple data sources 214. Additionally, the DV engine 210 can send the aggregated results to the requesting client 202. Further, in some embodiments of the present disclosure, the DV governance manager 108 can generate visualizations of the retrieved and aggregated results.

In this way, some embodiments of the present disclosure can extend the policies and rules derived from unstructured data, and enhance restrictions by using the organizational and/or enterprise policies and cross-border-country, governmental, and/or third party regulatory rules as part of structured, semi-structured or unstructured repositories. Further, some embodiments of the present disclosure can maintain the derived policies, rules and restrictions from multiple sources and further analyze them to identify common patterns. Accordingly, some embodiments of the present disclosure can translate the identified common patterns to corporate common libraries, which can then be published as data policy and/or rule framework packs for consumer services usage such as, application integrations; database queries; extract, transform, and load (ETL) jobs; and, the like.

Further, some embodiments of the present disclosure can provide an ability to configure the rules at near-runtime in a human-readable format that the DV query model 112 can translate into a predetermined query format and that can provide, and restrict, access to data. Additionally, the DV governance manager 108 can fetch and automatically apply the determined data governance rules and policies 106 to allow or restrict data by assessing the current contextual information available via collaboration integration systems. For example, the DV governance manager 108 can potentially override a scenario where the contract says the data access is restricted to clients that have completed an on-boarding process if there are constraints on time and the on-boarding process is lengthy. In such a scenario, the DV governance manager 108 can determine that a client 104 has not completed on-boarding, but that the client 104 can access the data on an exceptional basis based on the analysis of an email or chat services. In this way, the example system DV governance manager 108 can consider this contextual information and automatically enable exception rules, for a new employee, for example, and allow access to data for visualization.

Figure 5:
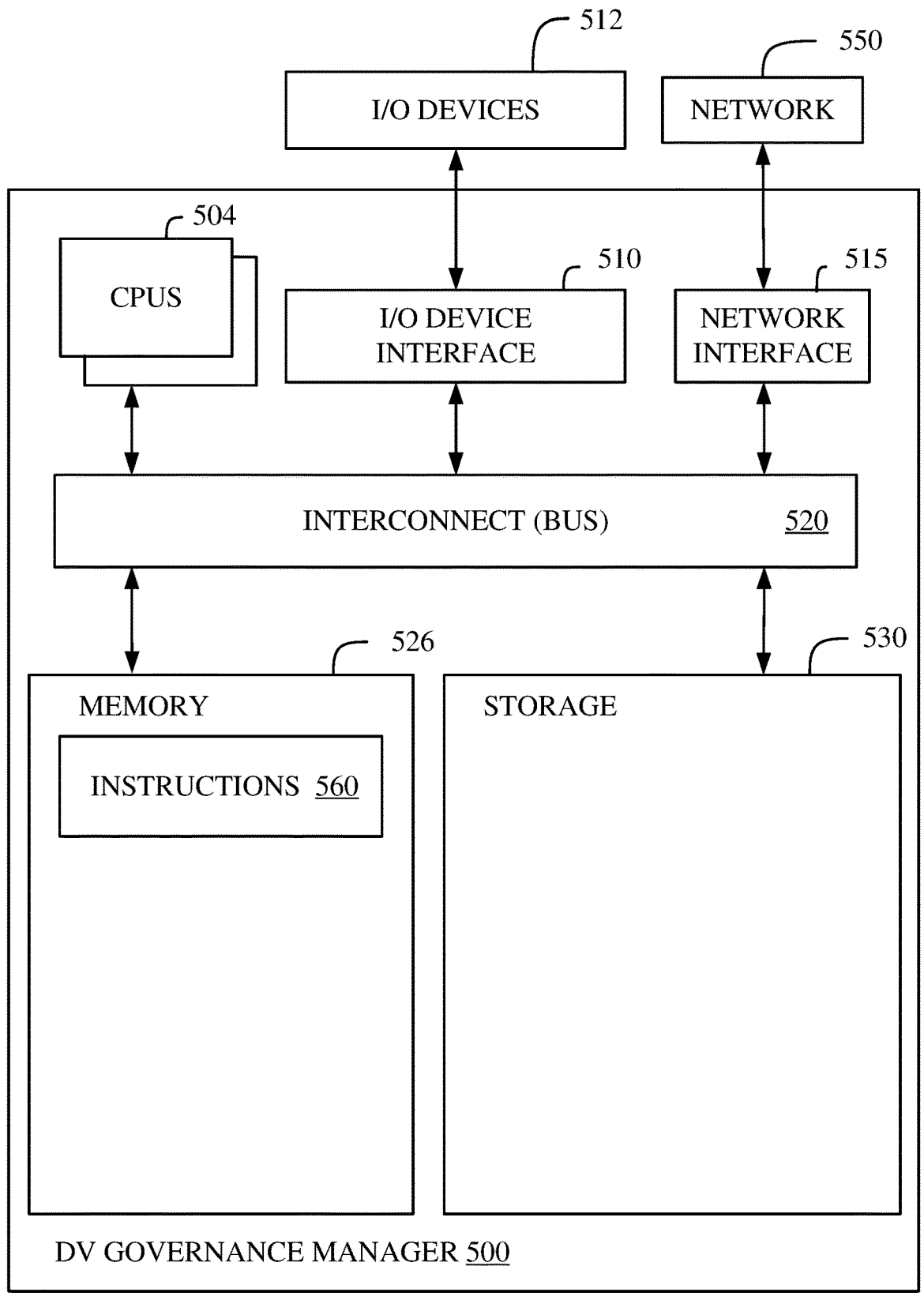
FIG. 5 is a block diagram of an example data virtualization governance manager, in accordance with some embodiments of the present disclosure.

FIG. 5 is a block diagram of an example DV governance manager 500, in accordance with some embodiments of the present disclosure. In various embodiments, the DV governance manager 500 is similar to the DV governance manager 108, and can perform the methods described in FIGS. 2 and 4 and/or the functionality discussed in FIGS. 1 and 3. In some embodiments, the DV governance manager 500 provides instructions for the aforementioned methods and/or functionalities to a client machine such that the client machine executes the method, or a portion of the method, based on the instructions provided by the DV governance manager 500. In some embodiments, the DV governance manager 500 comprises software executing on hardware incorporated into a plurality of devices.

The DV governance manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the DV governance manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the methods described in FIGS. 2 and 4 and/or the functionality discussed in FIGS. 1 and 3.

In various embodiments, the I/O devices 512 include an interface capable of presenting information and receiving input. For example, I/O devices 512 can present information to a listener interacting with DV governance manager 500 and receive input from the listener.

The DV governance manager 500 is connected to the network 550 via the network interface 515. Network 550 can comprise a physical, wireless, cellular, or different network.

In some embodiments, the DV governance manager 500 can be a multi-user mainframe computer system, a single-user system, or a server computer or similar device that has little or no direct user interface but receives requests from other computer systems (clients). Further, in some embodiments, the DV governance manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary DV governance manager 500. In some embodiments, however, individual components can have greater or lesser complexity than as represented in FIG. 5, components other than or in addition to those shown in FIG. 5 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
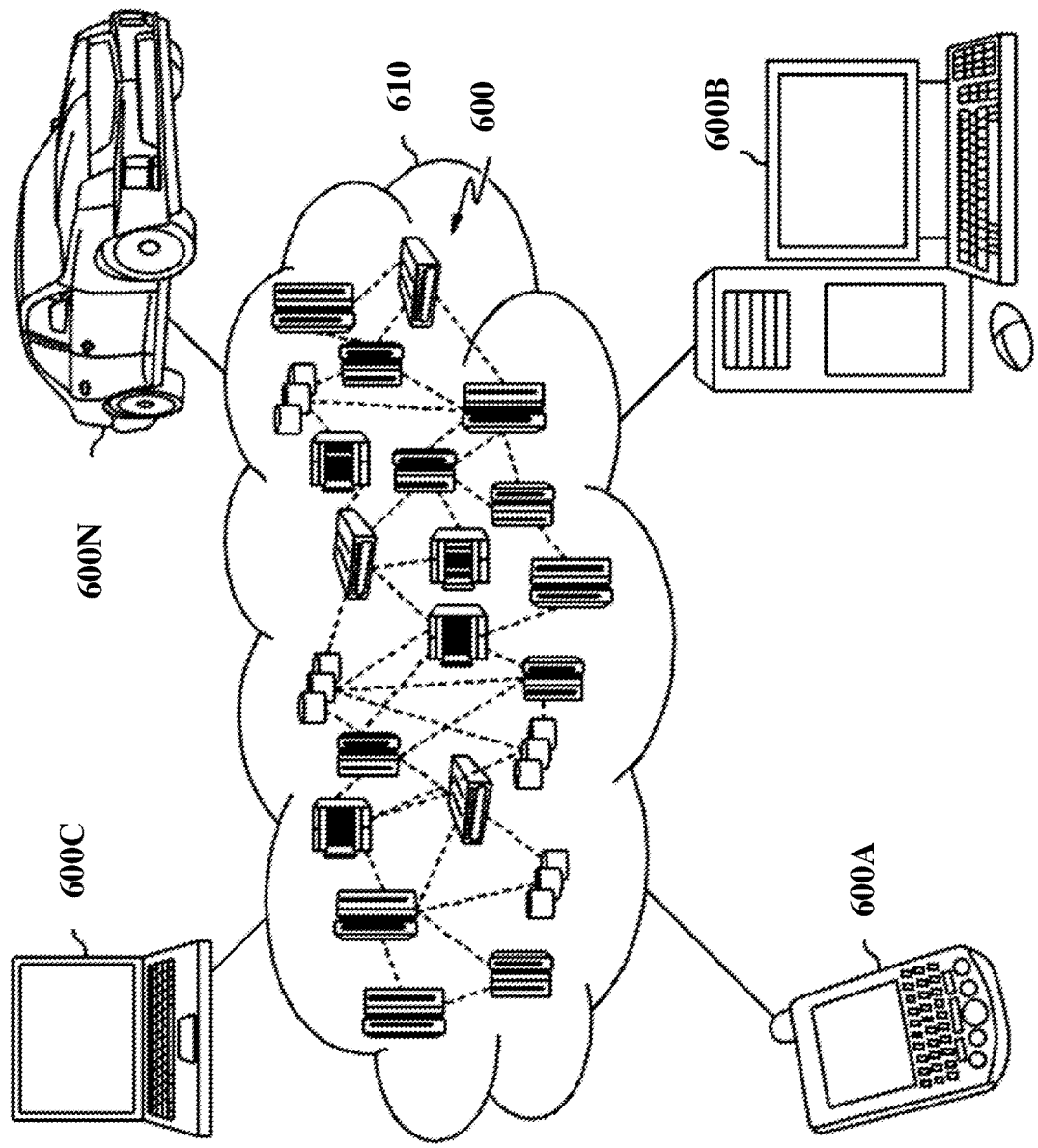
FIG. 6 is a cloud computing environment, in accordance with some embodiments of the present disclosure.

FIG. 6 is a cloud computing environment 610, according to some embodiments of the present disclosure. As shown, cloud computing environment 610 includes one or more cloud computing nodes 600. The cloud computing nodes 600 can perform the method described in FIGS. 2 and 4 and/or the functionality discussed in FIGS. 1 and 3. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
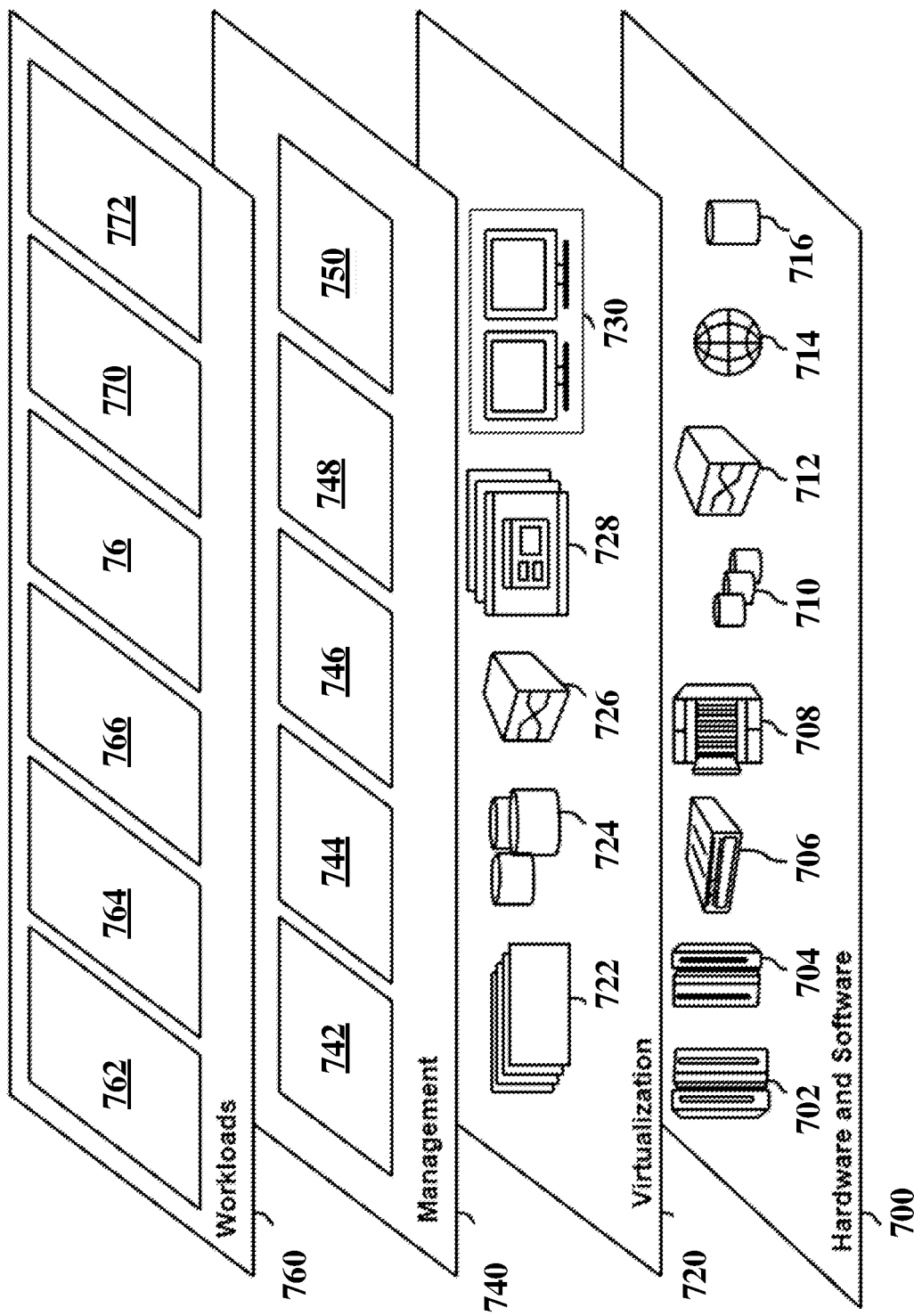
FIG. 7 is a set of functional abstraction model layers provided by the cloud computing environment, in accordance with some embodiments of the present disclosure.

FIG. 7 is a set of functional abstraction model layers provided by cloud computing environment 610 (FIG. 6), according to some embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and DV governance manager 772.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   determining a context of a data access request for a data virtualization engine;
   determining a plurality of data sources that are relevant to the data access request by using a governance machine learning model, wherein the governance machine learning model is trained to predict the data sources based on the data access request and the context;
   determining, before performing the data access request, a plurality of data governance rules-policies that are relevant to the data access request, by using the governance machine learning model, wherein the governance machine learning model is further trained to predict the plurality of data governance rules-policies based on the data sources and the context, and wherein the plurality of data governance rules-policies defines a corresponding plurality of data regulations based on a plurality of legal jurisdictions associated with a plurality of legal responsibilities; and
   generating, by using a query machine learning model, a data access command executable by the data virtualization engine that is configured to retrieve data from the data sources and apply the plurality of determined data governance rules-policies, wherein generating the data access command comprises automatically translating the determined data governance rules-policies into QUERY understandable format, and wherein automatically translating the determined data governance rules comprises:
   using semantic analytics on the determined data governance rules-policies; and
   applying machine learning techniques.

2. The method of claim 1, wherein the machine learning techniques comprise one selected from a group consisting of:
   supervised learning; and
   unsupervised learning.

3. The method of claim 1, further comprising generating a visualization of a result generated by the data virtualization engine, wherein the result comprises an actual data result and a masked result.

4. The method of claim 3, wherein the visualization comprises a multi-dimensional visualization.

5. The method of claim 1, wherein the governance machine learning model learns to generate an exception data governance rule-policy based on training data comprising one or more historical data access requests that are related to the data access request, and one or more associated historical data governance rule-policies.

6. The method of claim 1, further comprising generating a result for the data access request using the data virtualization engine and the data access command.

7. The method of claim 1, wherein the governance machine learning model is trained to determine a context for the data access request using historical changes to the determined data governance rules-policies.

8. The method of claim 1, wherein the determined data governance rules-policies comprise one selected from a group consisting of:

text documents;
video recordings;
images; and
email.

9. The method of claim 1, wherein the data access command comprises a structured query language command.

10. The method of claim 1, further comprising:
aggregating a plurality of results generated by the data sources; and
providing the aggregated results for a client that provides the data access request.

11. A computer program product comprising one or more computer readable storage media, and program instructions collectively stored on the one or more computer readable storage media, the program instructions comprising instructions configured to cause one or more processors to perform a method comprising:
determining a context of a data access request for a data virtualization engine;
determining, before performing the data access request, a plurality of data governance rules-policies that are relevant to the data access request, by using a governance machine learning model, wherein the governance machine learning model is further trained to predict the data governance rules-policies based on the data sources and the context, and wherein the plurality of data governance rules-policies defines a corresponding plurality of data regulations based on a plurality of legal jurisdictions associated with a plurality of legal responsibilities; and
generating, by using a query machine learning model, a data access command executable by the data virtualization engine that is configured to retrieve data from the data sources and apply the plurality of determined data governance rules-policies, wherein generating the data access command comprises automatically translating the determined data governance rules-policies into QUERY understandable format, and wherein automatically translating the determined data governance rules comprises:
using semantic analytics on the determined data governance rules-policies; and
applying machine learning techniques.

12. The computer program product of claim 11, wherein automatically translating the determined data governance rules comprises:
using semantic analytics on the determined data governance rules-policies; and
applying machine learning techniques.

13. The computer program product of claim 11, further comprising generating a visualization of a result generated by the data virtualization engine, wherein the result comprises an actual data result and a masked result.

14. The computer program product of claim 13, wherein the visualization comprises a multi-dimensional visualization.

15. The computer program product of claim 11, wherein the governance machine learning model learns to generate an exception data governance rule-policy based on training data comprising one or more historical data access requests that are related to the data access request, and one or more associated historical data governance rule-policies.

16. The computer program product of claim 11, wherein the data determined governance rules-policies comprise one selected from a group consisting of:
text documents;
video recordings;
images; and
email.

17. A system comprising:
one or more computer processing circuits; and
one or more computer-readable storage media storing program instructions which, when executed by the one or more computer processing circuits, are configured to cause the one or more computer processing circuits to perform a method comprising:
determining a context of a data access request for a data virtualization engine;
determining a plurality of data sources that are relevant to the data access request by using a governance machine learning model, wherein the governance machine learning model is trained to predict the data sources based on the data access request and the context;
determining, before performing the data access request, a plurality of data governance rules-policies that are relevant to the data access request, by using the governance machine learning model, wherein the governance machine learning model is further trained to predict the data governance rules-policies based on the data sources and the context, and wherein the plurality of data governance rules-policies defines a corresponding plurality of data regulations based on a plurality of legal jurisdictions associated with a plurality of legal responsibilities; and
generating, by using a query machine learning model, a data access command executable by the data virtualization engine that is configured to retrieve data from the data sources and apply the determined data governance rules-policies, wherein generating the data access command comprises automatically translating the determined data governance rules-policies into QUERY understandable format, and wherein automatically translating the determined data governance rules comprises:
using semantic analytics on the determined data governance rules-policies; and
applying machine learning techniques.

18. The system of claim 17, wherein the governance machine learning model learns to generate an exception data governance rule-policy based on training data comprising one or more historical data access requests that are related to the data access request, and one or more associated historical data governance rule-policies.

* * * * *